UNITED STATES PATENT OFFICE.

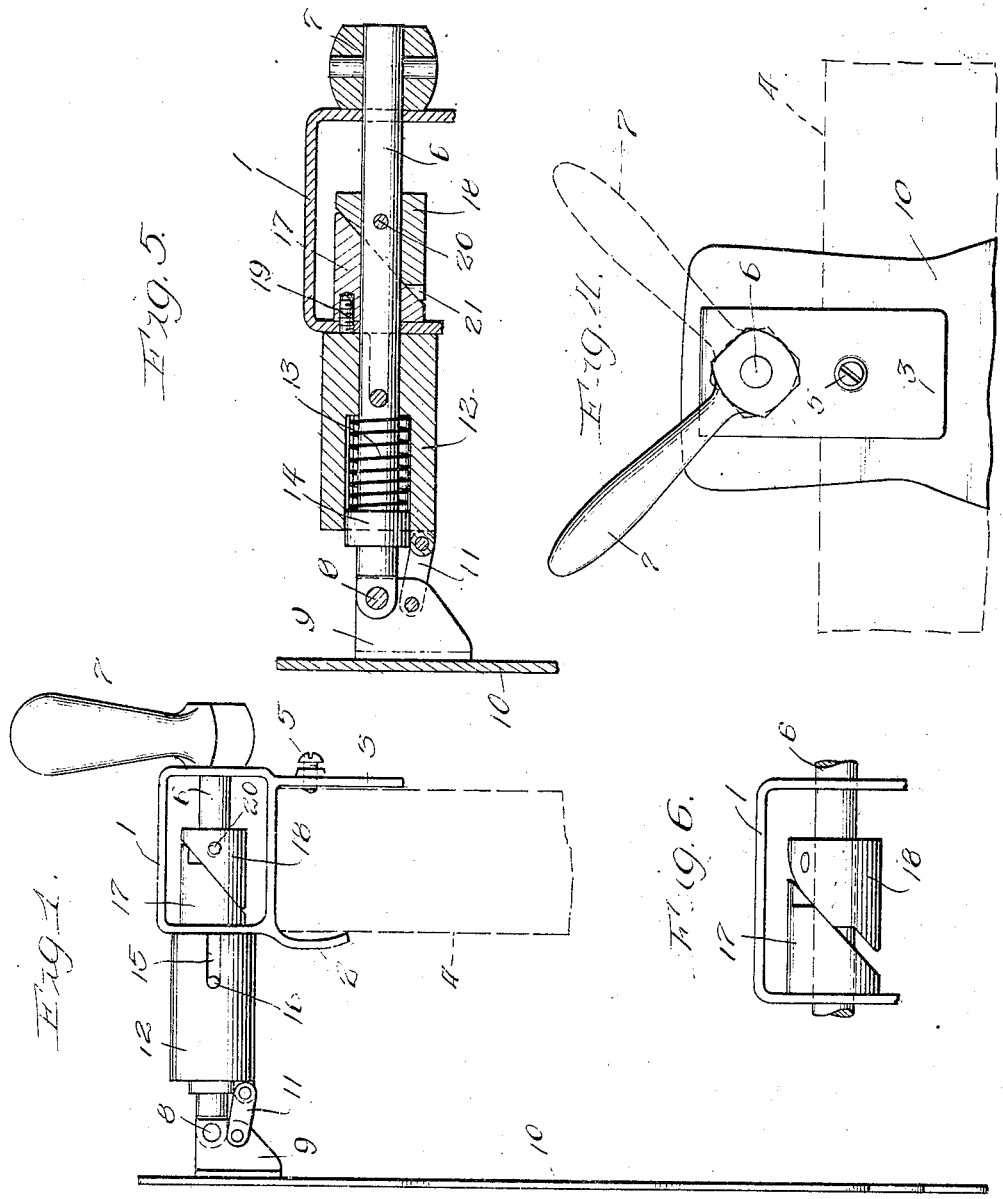

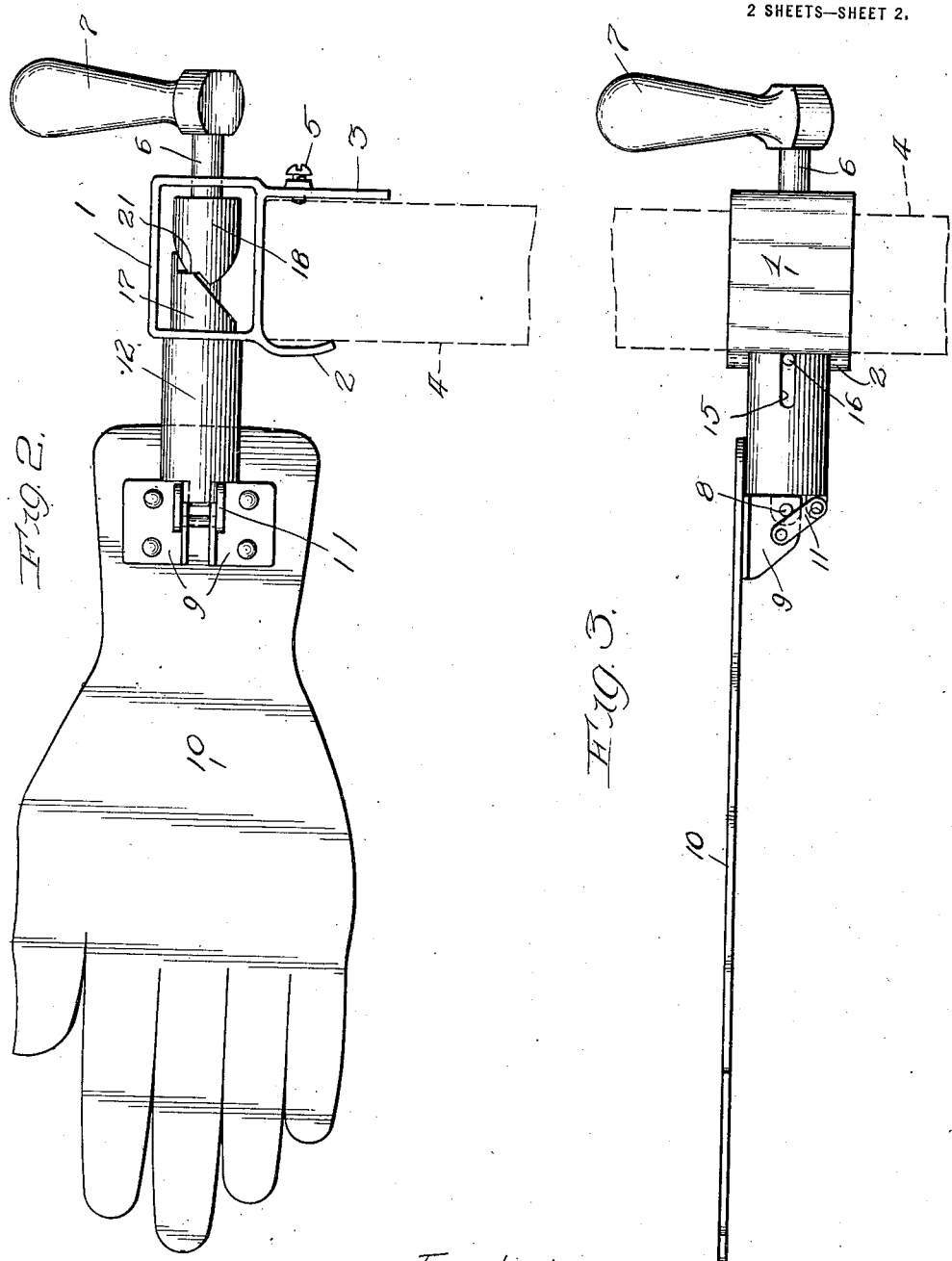

CARL B. QUARFOOT, OF CHICAGO, ILLINOIS.

DIRECTION-INDICATOR FOR AUTOMOBILES.

1,374,470. Specification of Letters Patent. Patented Apr. 12, 1921.

Application filed June 30, 1920. Serial No. 392,989.

*To all whom it may concern:*

Be it known that I, CARL B. QUARFOOT, citizen of the United States, residing at Chicago, Illinois, have invented certain new and useful Improvements in Direction-Indicators for Automobiles; and I do hereby declare the following to be a full, clear, and exact description of the invention, such as will enable others skilled in the art to which it appertains to make and use the same.

My invention relates to a signaling apparatus for indicating when a vehicle is about to make a turn, and in its general objects aims to provide a simple, easily manipulated and effective apparatus which will serve as a substitute for the arm of the driver as ordinarily held out by the latter to indicate when he proposes to make a change in the direction of the vehicle which he is driving. More particularly, my invention aims to provide an indicator of this kind in which the indicating arm will normally be firmly held in such a position that it cannot readily be seen from either the front or the rear of the vehicle, but which can easily be manipulated to swing this arm into a position in which it projects laterally from the vehicle to render the arm easily visible either from the front or from the rear of the vehicle. Furthermore, my invention aims to provide means for twisting the arm while it is being moved from its normal inoperative position at its conspicuous indicating position, so that a relatively thin arm when used for this purpose may normally be disposed parallel to the side of the vehicle, but will be held in substantially a vertical plane when swung to its operative position. My invention also aims to provide an unusually effective and durable mechanism for moving the indicating arm from one position to the other, to arrange this mechanism so that it can readily be manipulated from the inside of the car and so that it will hold the arm firmly latched in either of its said two positions, and to provide simple means for attaching the entire indicating mechanism to a car without performing any work on the latter. Still further and more detailed objects will appear from the following specification and from the accompanying drawings, in which—

Figure 1 is an elevation of an indicator embodying my invention, taken from the front of an automobile and showing a door of the latter in dotted lines, the indicator being shown in its normal or inoperative position.

Fig. 2 is a similar view taken after the indicating arm has been swung to its operative or indicating position.

Fig. 3 is a plan view of the mechanism, taken with the arm in the indicating position of Fig. 2.

Fig. 4 is a fragmentary elevation of the same mechanism, taken from the right hand of Fig. 1.

Fig. 5 is an enlarged and fragmentary section taken through the axis of the shaft of Fig. 1 and along a plane parallel to the latter figure.

Fig. 6 is an elevation of a part of the operating mechanism, showing the two cams as they appear when the indicator arm has reached a position intermediate of the positions of Fig. 1 and Fig. 2.

In accomplishing the purposes of my invention after the manner of the accompanying drawings, I employ as a support for my mechanism a metal frame 1 which includes a downwardly directed fork adapted to straddle the upper edge of a door 4 of an automobile. When thus in position, this supporting frame is locked in position by a screw 5, with a portion of this frame resting on the upper edge of the door to afford a firm bearing for the frame.

Extending horizontally through the frame 1 is a shaft 6 which may be rocked back and forth by means of a handle 7 pinned to the shaft. This shaft is connected at its outer end by a pivot pin 8 to a bracket 9 carrying an indicating arm 10, which arm desirably is made of sheet metal and formed in resemblance of a human hand. The bracket 9 (which is here pictured as made of two coöperating portions) is also connected through a link 11 with a cylinder 12 which is continually pressed against the outer face of the frame 1 by a spring 13. This spring is housed by the cylinder and interposed between a collar 14 on the shaft 6 and the head of the cylinder, the cylinder head being directed toward the frame 1 as shown in Fig. 5. Adjacent to the same end of the cylinder 12, the latter has a longitudinal slot 15 which houses the ends of a pin 16 extending transversely through the shaft 6, so as to prevent a relative rotation of the shaft with respect to this cylinder, although permitting a longitudinal movement of the shaft with respect to the cylinder. Owing to this connection between the shaft and the cylinder to which the bracket 9 is connected by the links 11, a movement of the handle 7 for a quarter turn from its normal position of Fig. 4 to the position shown in dotted lines in the same figure will swing the axis of the arm 10 from a vertically depending position to a horizontal position.

This movement alone would merely cause the indicating arm to be extended flatwise of the car along the side of the latter in a horizontal position, so that it still would be inconspicuous unless it is also moved about the pivot 8 into a position at right angles to that of Fig. 1. To accomplish this, I mount within the frame 1 a pair of cams 17 and 18 through both of which the shafts 6 extend and arrange these so that a rocking of the shaft 6 for a quarter turn will cause the cams to move the shaft 6 longitudinally against the pressure of the spring 13, whereby the bracket 9 coöperates with the links 11 in swinging the indicating arm 10 from the position of Figs. 1 and 5 to the position of Fig. 3. Each of these cams desirably consists of a tube bored to correspond to the shaft 6 and having one end disposed along a plane oblique to the axis of the tube. The cam 17 is rigidly secured to the frame 1 by any suitable means, such as a screw 19, while the cam 18 is fastened to the shafts 6 by a pin 20. Furthermore, each of the cams has a portion of its acute end cut away along a plane at right angles to the axis of the cam, so as to afford a pair of shoulders 21 adapting the cams to lock against each other after the manner of Fig. 2 when the shaft has been moved to the position shown in dotted lines in Fig. 4.

With the mechanism arranged as above described, the downwardly directed fork of the frame 1 can readily be slipped over the upper edge of the door 4 of an automobile, this being done with the handle 7 on the inside of the vehicle. Normally, the parts are then disposed as shown in Figs. 1 and 5 (and as shown in full lines in Fig. 4), so that the indicating arm 10 depends parallel with the side of the door and presents only its edge to an observer in front of the vehicle or behind the latter, thus making this arm inconspicuous. When in this position, the pressure of the spring 13 on the collar 14 keeps the shaft 6 slid outwardly of the car and hence operates through the pivot 8 and the links 11 for holding the indicating arm firmly in its inoperative position in spite of any jarring of the car.

When the driver of the vehicle proposes to make a turn, he swings the handle 7 from the position shown in full lines in Fig. 4 to that shown in dotted lines in the same figure, thereby rotating the shaft 6 a quarter turn. While doing this, the inclined ends of the cams 17 and 18 ride upon one another as shown in Figs. 5 and 6, thereby moving the shaft inward of the vehicle against the resistance of the spring 13. During this movement, the connections of the bracket 9 to the shaft and through the links 11 to the cylinder 12 cause the indicating arm to swing outwardly or away from the car, so that this arm is simultaneously swung outward and rotated into a substantially vertical plane. On completion of the movement of the handle, the shoulders 21 afforded by the notches adjacent to the tips of the two cams lock upon each other by the action of the spring 13. Consequently, the mechanism is then firmly latched in its indicating position, so that the operator need not retain a hold of the handle 7, but has free use of both of his hands for attending to the operation of the car. However, a slight backward movement of the handle 7 will release the engagement of the shoulders 21, whereupon the spring 13 will bring the parts back to their starting position.

It will be evident from the above that the indicating arm will be held securely in either of its two extreme positions, that the movement from one position to another can be effected very quickly by the driver of the car, and that the signaling mechanism can readily be operated from the inside of the car and with a very simple movement. However, I have only illustrated and described my invention in a single embodiment involving highly desirable features of construction such as an indicating arm comprising a metal hand and separately formed brackets fastened to this hand, and a connecting sleeve in the form of a laterally slotted cylinder. However, I do not wish to be limited to these or other details of the construction and arrangement here disclosed, it being obvious that numerous additions, omissions or other changes might be made without departing from the spirit of my invention or from the scope of the appended claims.

I claim as my invention:

1. A direction indicator for a vehicle, comprising a supporting member, a horizontal shaft mounted thereon, and extending transversely of the vehicle, means operable from inside the vehicle for rotating the shaft, an indicating arm pivoted to the outer end of the shaft and having a substantially flat indicating portion normally depending in a plane substantially parallel to the side of the vehicle, and a pair of cams respectively fast upon the shaft and the supporting member, the said cams coöperating for causing a quarter rotation of the shaft to swing the indicating arm so as to bring the said indicating portion into a vertical plane transverse of the vehicle.

2. In a direction indicator for a vehicle, a manually rotatable shaft continually disposed transversely of the vehicle and mounted for permitting longitudinal movement of the shaft, an indicating arm pivoted to one end of the shaft and normally disposed in a plane parallel to the side of the vehicle, means for causing a partial rotation of the shaft to slide the latter longitudinally, and means actuated by such sliding of the shaft for moving the indicator about its pivot into a vertical plane transverse of the vehicle.

3. In a vehicle direction indicator, a manually rotatable shaft, an indicating arm pivoted to one end of the shaft, and means for causing a partial rotation of the shaft to move the arm a quarter turn about its pivotal connection to the shaft; the said means including a pair of cams through which the shaft extends, one of the cams being stationary and the other fastened to the shaft, the two cams having interengaging faces oblique to the axis of the shaft.

4. In a vehicle direction indicator, a manually rotatable shaft, an indicating arm pivoted to one end of the shaft, and means for causing a partial rotation of the shaft to move the arm a quarter turn about its pivotal connection to the shaft; the said means including a pair of cams through which the shaft extends, one of the cams being stationary and the other fastened to the shaft, the two cams having interengaging faces oblique to the axis of the shaft and having interengaging formations upon their said oblique faces for locking the mechanism with the arm in its last named position, and spring means for holding the cam shoulders interlocked.

5. In a direction indicator for a vehicle, a manually rotatable shaft continually disposed transversely of the vehicle and mounted for permitting longitudinal movement of the shaft, an indicating arm pivoted to one end of the shaft and normally disposed in a plane parallel to the side of the vehicle, means for causing a partial rotation of the shaft to slide the latter longitudinally, and means actuated by such sliding of the shaft for moving the indicator about its pivot into a vertical plane transverse of the vehicle, in combination with single spring means for resisting the sliding of the shaft and for holding the indicator in either of its said two positions.

6. In a vehicle direction indicator, a support, a shaft journaled therein with freedom for limited longitudinal movement, a sleeve on the shaft, means for preventing relative rotational movement of the sleeve with respect to the shaft while permitting relative longitudinal movement thereof, an indicating arm pivoted to one end of the shaft, means for causing a partial rotation of the shaft to move the latter longitudinally with respect to the sleeve, and means connecting the indicating arm with the sleeve for causing a longitudinal movement of the shaft with respect to the sleeve to move the arm about its pivotal connection with the shaft.

7. In a vehicle direction indicator, a support, a shaft journaled therein with freedom for longitudinal movement, a sleeve on the shaft, means for preventing relative rotational movement of the sleeve with respect to the shaft while permitting relative longitudinal movement thereof, an indicating arm pivoted to one end of the shaft, cam means for causing a partial rotation of the shaft to move the latter longitudinally with respect to the sleeve, and a link connecting the arm with the sleeve and arranged for causing a longitudinal movement of the shaft with respect to the sleeve to move the arm about its pivotal connection with the shaft.

8. In a vehicle direction indicator, a support including a vertical web, a shaft journaled in the web and slidable with respect to the web, a cam secured to one face of the web, means fast on the shaft and coacting with the cam to cause a rotary movement of the shaft to slide the latter longitudinally, a sleeve on the shaft at the other side of the web, means for preventing the sleeve from rotating with respect to the shaft, an indicating arm and means connecting the indicating arm with both the sleeve and the shaft for causing a sliding of the latter to move the indicating arm about an axis transverse of the shaft.

9. Mechanism as per claim 8, in combination with a spring housed by the sleeve and arranged for resisting a sliding of the shaft.

Signed at Chicago, June 28th, 1920.

CARL B. QUARFOOT.